United States Patent
George

(10) Patent No.: US 6,889,700 B2
(45) Date of Patent: May 10, 2005

(54) METHOD AND APPARATUS FOR FLUID FLOW CONTROL

(76) Inventor: Fred George, 150 Old Stonewall Rd., Easton, CT (US) 06612

( * ) Notice: Subject to any disclaimer, the term of this patent is extended or adjusted under 35 U.S.C. 154(b) by 185 days.

(21) Appl. No.: 10/349,556

(22) Filed: Jan. 23, 2003

(65) Prior Publication Data

US 2004/0144427 A1 Jul. 29, 2004

(51) Int. Cl.⁷ .............................................. G05D 7/06
(52) U.S. Cl. .......................... 137/8; 137/486; 137/499; 137/487.5
(58) Field of Search ................................. 137/499, 486, 137/487.5, 8; 415/30, 202

(56) References Cited

U.S. PATENT DOCUMENTS

| | | | | |
|---|---|---|---|---|
| 3,279,496 A | * | 10/1966 | Klass et al. .............. | 137/487.5 |
| 3,370,831 A | * | 2/1968 | Lazar ........................ | 415/29 |
| 4,333,486 A | * | 6/1982 | Ciccozzi .................... | 137/1 |
| 5,152,309 A | * | 10/1992 | Twerdochlib et al. .......... | 137/8 |
| 5,287,884 A | * | 2/1994 | Cohen ........................ | 137/486 |
| 5,409,034 A | * | 4/1995 | Ostertag et al. ............. | 137/499 |

* cited by examiner

*Primary Examiner*—Stephen M. Hepperle
(74) *Attorney, Agent, or Firm*—Barry R. Lipsitz; Douglas M. McAllister

(57) ABSTRACT

Methods and apparatus are provided for modulating a flow of fluid in a duct using a rotating member that rotates in the duct. A sensing unit senses the rotation speed of the rotating member and generates a rotation signal as a function of the sensed rotation speed. A control unit receives the rotation signal from the sensing unit and generates a control signal to modify the rotation speed of the rotating member. The apparatus can be self-powering by generating an electric current in response to rotation of the blade.

28 Claims, 5 Drawing Sheets

METHOD AND APPARATUS FOR FLUID FLOW CONTROL

BACKGROUND OF THE INVENTION

1. Field of the Invention

This invention relates generally to controlling the flow of fluid by controlling the speed of rotation of a rotating member. More particularly, this invention relates to modulating an airflow within a duct by measuring flow rate and modifying the speed of rotation of a blade.

2. Background Art

One type of conventional valve that is used for air control is, for example, the Phoenix venturi valve, which utilizes a duct section in the form of a venturi. The valve includes a spring or cone that is mounted on a shaft. The shaft is attached to a spring of a constant mass which is designed to maintain a constant airflow regardless of changes in static pressure in the duct. The valve is designed to operate in a pressure independent manner between 0.6 inches and 6.0 inches water column static pressure. The shaft can be modulated to vary the flow while the spring/cone slides on the shaft to maintain its pressure independence. The valve does not directly measure flow, but is calibrated over numerous points and designed to maintain a relatively accurate flow control. The valve can be modulated using either a pneumatic actuator or electric actuator.

Another type of conventional valve is a pneumavalve, such as the Tek-Air Pneumavalve. This valve utilizes a series of bladders that are surrounded by sheet metal and spaced about one inch apart in a metal casing. A 1–10 pound per square inch (PSI) control signal inflates the bladders so that the bladders restrict airflow in a duct. This pneumavalve may be fabricated from either stainless steel or galvanized steel/aluminum depending on the desired application. The pneumavalve is not pressure independent. In order to provide pressure independence, this type of valve must be used in conjunction with an airflow sensor. Since the pneumavalve operates using pneumatic control air, it cannot operate electronically.

VAV (Variable Air Volume) Terminal boxes are devices used to modulate airflow. These devices are typically cylindrical sections of sheet metal with a round damper on a shaft positioned in a duct section. The damper is rotated throughout a 90-degree arc to vary the flow in the duct section. The boxes are not pressure independent and require an airflow sensor. The flow sensor is typically mounted on an inlet portion of the duct section and a controller is used to maintain a desired flow. A pitot tube flow sensor is used to sense airflow and the pitot tube flow sensor has limited turndown flow capacity. Since such dampers are not linear devices, accurate control of airflow is very limited. When the device is moving from a fully closed position to an open position, there is initially a relatively large change in airflow versus control signal and the reverse happens when the device is close to fully open.

It would be advantageous to provide methods and apparatus for the control of fluid flow that do not suffer from the disadvantages of known systems. It would be further advantageous to provide a new type of rotary damper that is efficient, cost effective, reliable and easy to incorporate into both new and existing systems, such as heating, ventilation, and/or air conditioning systems. The present invention provides fluid flow control methods and apparatus having these and other advantages.

SUMMARY OF THE INVENTION

Accordingly, one embodiment of the present invention is directed to a method for modulating an airflow in a duct. The method includes driving a rotating element with the airflow and providing a flow signal indicative of the flow rate. A rate of rotation of the rotating element is varied in response to the flow signal thereby modulating the airflow.

In a further embodiment of the present invention, a desired flow rate can be achieved by sensing rotations of the blade over time, such as rotations per minute (RPM). A control system responds to the sensed information to modify the speed of the blade, thereby modifying flow rate.

A method is provided for fluid flow control within a duct. The method includes the steps of providing a flow of fluid to rotate a turbine disposed in the duct. The flow of fluid is sensed in the duct and electrical signals are provided, in response to the sensing step, to modify rotation of the turbine, thereby controlling the fluid flow.

In an illustrated embodiment, a motor is used to sense the rotation of the turbine. The motor is also used to modify the rotation of the turbine.

Yet another embodiment of the present invention provides apparatus that modulates a flow of fluid in a duct. The apparatus includes a rotating member that rotates in the duct. A sensing unit senses rotation speed of the rotating member and generates a rotation signal as a function of the sensed rotation speed. A control unit receives the rotation signal from the sensing unit and generates a control signal for modifying the rotation speed of the rotating member.

A further embodiment of the invention provides apparatus that controls the flow of fluid in a duct. The apparatus includes a blade that is disposed in the duct and rotates in response to the flow of fluid through the duct. An electric current is generated by, for example, an electric motor in response to rotation of the blade. A control circuit, which is powered by the electric current, provides a control signal to control the speed of the motor and thereby, the rotation speed of the blade.

BRIEF DESCRIPTION OF THE DRAWINGS

The features of specific embodiments of the best mode contemplated of carrying out the invention are illustrated in the drawings, in which.

DETAILED DESCRIPTION OF THE INVENTION

The present invention provides an improved fluid flow control device. Such fluid flow can include any one or a combination of airflow, vapor flow, gas flow or liquid flow. The invention may be implemented as an electric device, a mechanical device, a pneumatic device, or a combination thereof. Flow measurement is provided, and is preferably (but not necessarily) built into the device to provide pressure independence over a very wide range of fluid flows.

Figure 1:
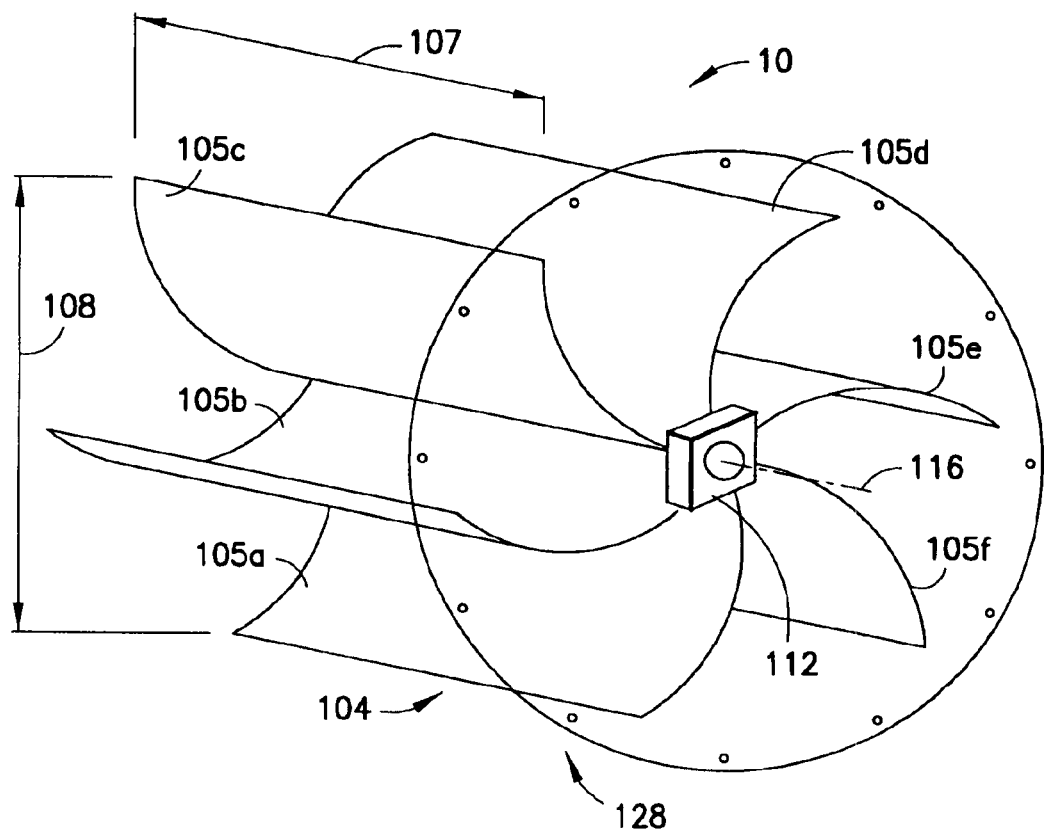
FIG. 1 is a perspective schematic view of a rotating member in accordance with the present invention.

FIG. 1 shows an assembly 10, which includes a rotating member 104. The rotating member 104 may be, for example, a blade, such as a fan blade, a wheel that has vane portions, a turbine blade, a paddle wheel structure, or other structure that is capable of restricting fluid flow. The member 104, as shown in FIG. 1, has a plurality of vane portions shown as 105(a)–(f) (although only 6 vane portions are shown, it will be apparent to those of ordinary skill in the art that any suitable number may be used). The member 104 may have portions with a forward curve shape, backward curve shape or a mixed curve shape. The motion of the rotating member 104 may be controlled to control or modulate a fluid flow that contacts member 104. The member 104 has a length dimension 107, which will depend on the width of a duct or other fluid conduit (hereinafter "duct") in which the rotating member is mounted, and a height dimension 108, which will depend on the height of the duct. It should be appreciated that the rotating member and associated components can be scaled to virtually any size required by the dimensions of the duct in which fluid flow is to be modulated.

A cover plate 128 may be disposed at an end portion of member 104. The cover plate 128 facilitates the positioning of rotating member 104 in a duct.

A shaft 116 is disposed along the horizontal, or transverse, axis of the member 104. A bearing 112 (which may be integrated with a brake or clutch assembly to be described hereinafter) is also mounted near the end portion of member 104. A suitable bearing (not shown) is also provided at the other end of shaft 116 in a conventional manner. The bearings facilitate the smooth rotation of the member 104.

Figure 2:
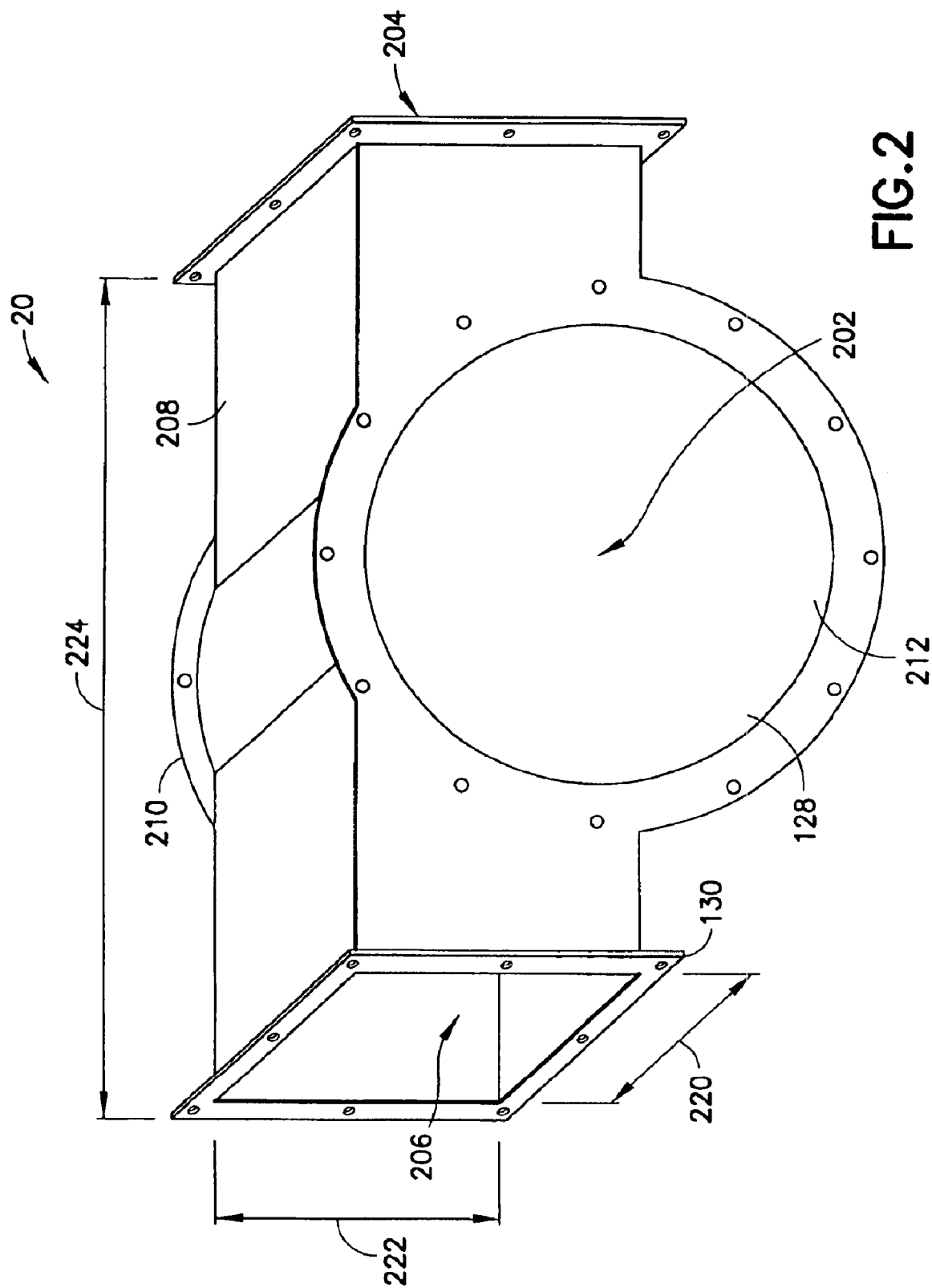
FIG. 2 is a perspective view of an example housing for a rotating member in accordance with the present invention.

FIG. 2 illustrates an assembly 20 that includes a duct section 208 and a housing 202, which is used to contain and support the rotating member or blade shown in FIG. 1. The housing 202 is disposed along a section of duct 208. The housing 202 may be fabricated from various materials depending on the application and environment of the device. Examples of housing materials include aluminum, galvanized steel, stainless steel, fiberglass, a variety of polymers such as, for example, PVC (polyvinyl chloride), CPVC, (chlorinated PVC), and any other material or combination of materials that exhibits the required characteristics to house the rotating blade. The rotating member, as described herein, is mounted in the housing 202 so that the blade portions are perpendicular to a fluid flow that enters the duct 208 through inlet portion 206. The duct is, for example, a heating ventilation air conditioning (HVAC) duct, an exhaust hood, or any system that provides a conduit for fluid flow.

Flange 130 is shown at the inlet portion 206. The duct 208 has a length dimension 224, a height dimension 222 and a width dimension 220. These dimensions 224, 222 and 220 are a function of the application of the duct 208. Outlet portion 204 of duct 208 provides a flow path for fluid that is traveling through the duct.

The housing 202 has extended portions 210 and 212 that enable the blade to fit in the housing with enough space to allow the blade to freely rotate. Cover plate 128 is provided to cover portion 212. The cover plate 128 is attached such that it may be removed for access to the rotating member for cleaning, repair, maintenance (e.g., lubrication) and replacement purposes. Inlet section 206 receives a flow of fluid (e.g., liquid, gas, vapor or a combination thereof). The fluid flow contacts the blades of the rotating member, which is mounted between portions 210 and 212, causing the member to rotate. A downstream airflow exits the housing via outlet section 204. The inlet section 206 and outlet section 204 dimensions will vary depending on the fluid flow requirements of the application.

The rotating blade or member will be sized to fit in the housing so that it will rotate freely in the fluid stream. In a preferred embodiment, the blade will fit inside the housing with a close tolerance to allow minimal air passage when the blade is in a stopped position.

Figure 3:
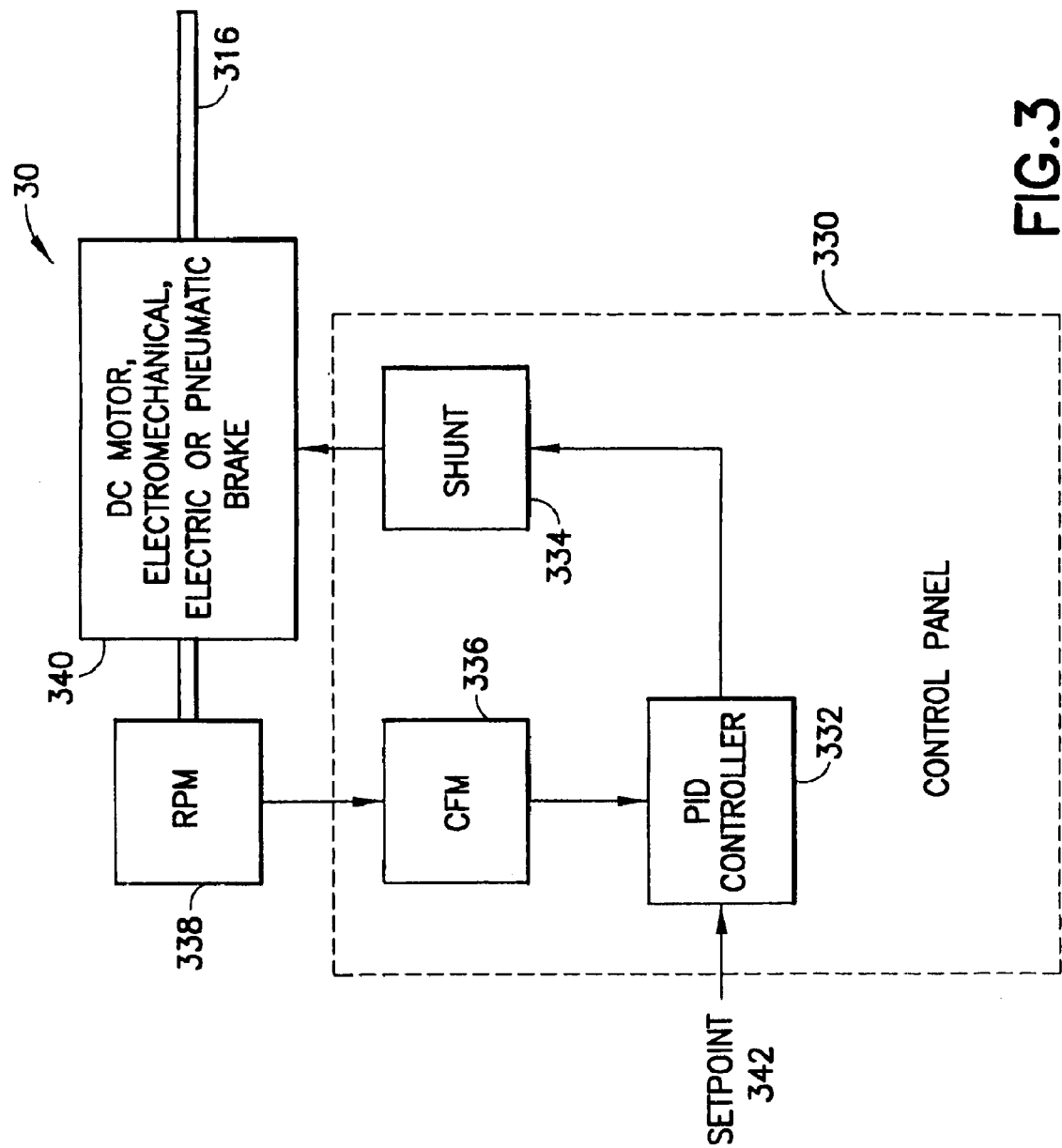
FIG. 3 is a block diagram of a control system that can be used with the present invention.

FIG. 3 is a block diagram of a control system 30 which can be used in an electric motor implementation of the invention. The system 30 is used to control, for example, a direct current (DC) motor 340 on the shaft 316 of the rotating member (not shown). A speed sensor module 338 (which measures, e.g., RPM) and a control module 330 are also provided. A flow of fluid is provided to a rotating member, which causes the rotating member to rotate. The shaft 316 is connected to the rotating member so that it rotates with the rotating member. The shaft 316 may extend outside the housing shown in FIG. 2, and several modules can be attached to the shaft depending on the application. For example, a DC motor 340 and an RPM sensor 338 are shown in FIG. 3.

The RPM sensor module 338 is used to sense the rate of rotation of the rotating member. The sensor module 338 may comprise any suitable speed sensor, such as an optical sensor, Hall effect sensor, or the like as well known in the art.

Control module 330 is coupled to the RPM sensor module 338 and receives a shaft speed signal from RPM sensor 338. The control module 330 includes a flow signal module 336, controller 332, which may be for example a proportional-integral (PI) or a proportional-integral-derivative (PID) controller, and a shunt unit 334. The control unit 330 may be mounted in the housing shown in FIG. 2.

The flow signal module 336 may comprise, for example, an inexpensive microprocessor or discrete logic that accepts the shaft speed signal from RPM sensor module 338 and converts the RPM signal to a flow signal using a pre-stored or hard wired algorithm. The flow signal is a function of the sensed rate of rotation of the rotating member, and may be a linear signal expressed, e.g., in cubic feet per minute (CPM). Alternatively, flow may be determined independently of RPM, by directly sensing the rate of fluid flow through the duct.

PID controllers, such as controller 332, are well known in the art. As shown in FIG. 3, the controller 332 receives a signal from the flow sensor module 336 and also receives a setpoint signal from setpoint input 342. The setpoint signal establishes a desired rotation speed for the rotating member and may be preprogrammed or may be input by an operator. The PID controller 332 generates an output signal that controls the speed of DC motor 340 via shunt 334. Varying the motor speed changes the rate of rotation of the rotating member, thereby modulating the airflow in the duct.

As an alternative to DC motor 340, an electric, electromechanical, or pneumatic brake unit or clutch can be provided. Such brake units and clutches are well known in the art and can operate, for example, using magnetic or pneumatic properties. The brake unit or clutch, which is attached to the shaft of the rotating member, will be responsive to an electric or pneumatic signal that will create resistance on the shaft causing the blade to slow in rotation, thereby restricting the fluid flow (e.g., airflow through the duct). By varying the electric or pneumatic signal, the fluid flow rate is varied.

In another embodiment similar to that illustrated in FIG. 3, a DC motor packaged together with an RPM module can be used to eliminate the need for a separate measuring device. Alternatively, the rotational speed may be determined, for example, by a magnetic sensor, photoelectric sensor, acoustic sensor, strain gage or optical sensor. The rotational speed may also be determined from a signal generated by a motor that is driven by the rotating member, which may be for example, a blade or a turbine.

Figure 4:
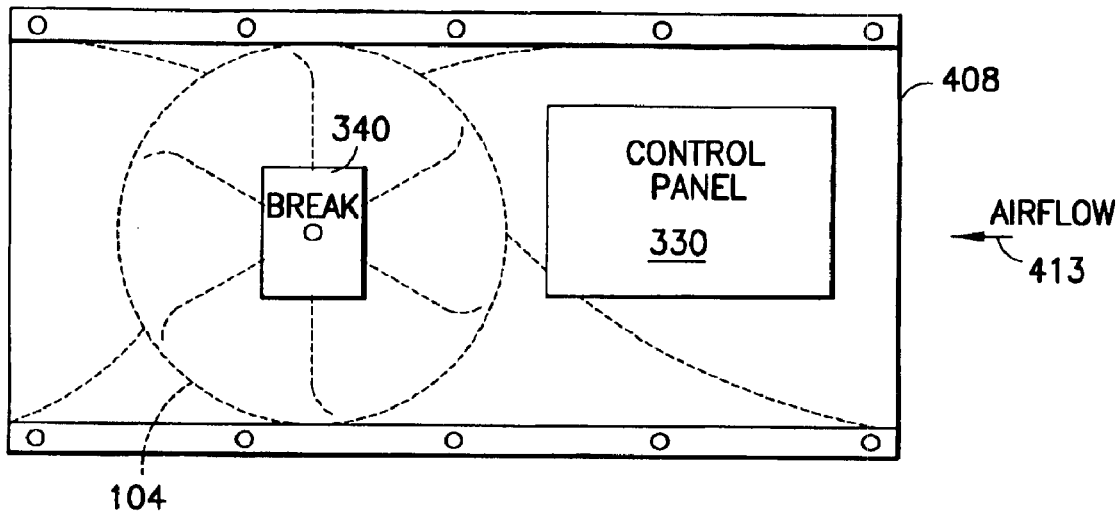
FIG. 4 is a schematic side view of a rotating member, brake and control panel situated in an air duct.

FIG. 4 shows a side view of the rotating member 104 and control panel 330 disposed proximate to duct 408. The control panel is typically mounted to an exterior surface of the duct for access by installation and/or repair personnel. The rotating member 104 is positioned perpendicular to the direction of incoming airflow 413. The control panel 330 is positioned so that it is operatively connected to the brake unit 340, and provides control signals to the brake unit 340.

Figure 5:
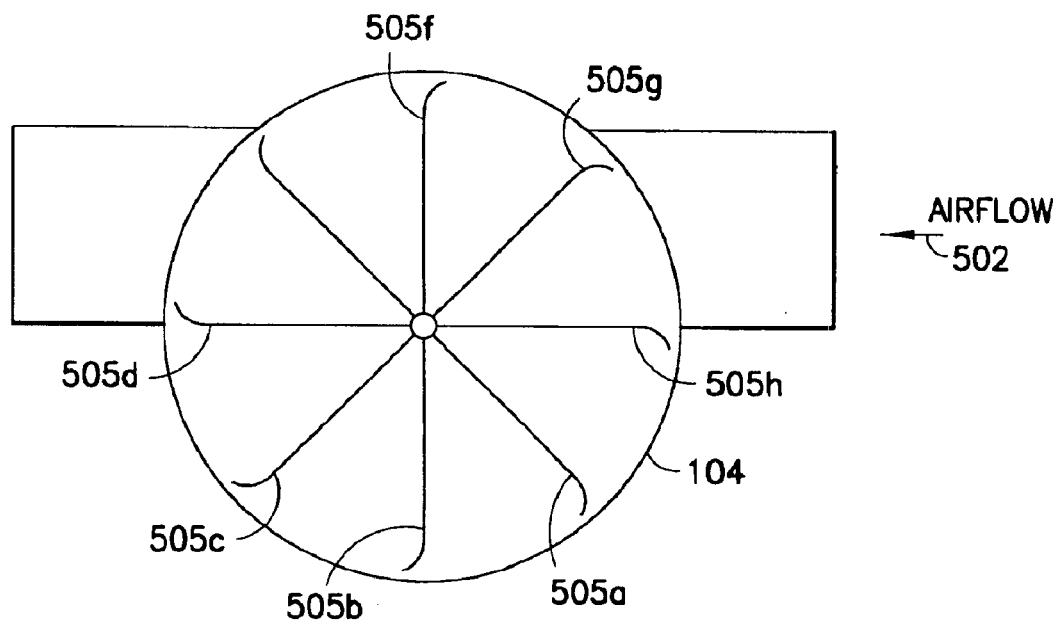
FIG. 5 is a schematic side view of a rotating member having substantially straight surfaces.

FIG. 5 shows a rotating member 104 having substantially straight surfaces 505(a)–(h), which interact with airflow 502. Although eight surfaces are shown on rotating member 104 in FIG. 5, the number of surfaces is a function of the application of the rotating member. Any suitable number that meets the design requirements may be used.

Figure 6:
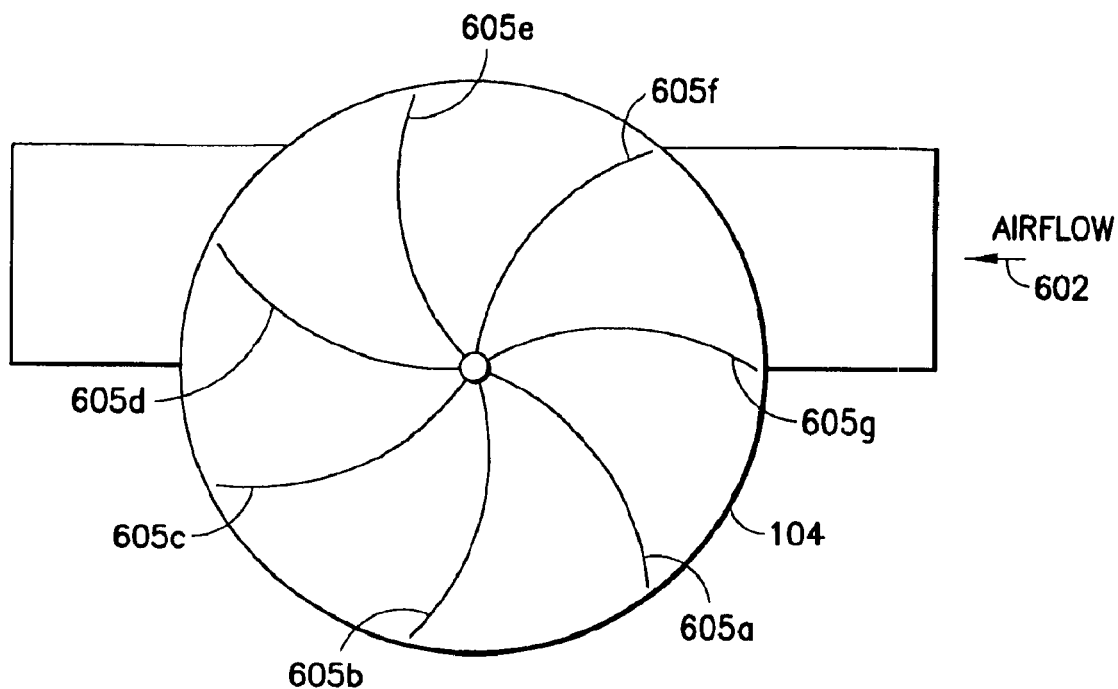
FIG. 6 is a schematic side view of a rotating member having curved surfaces.

FIG. 6 shows a rotating member 104 having curved surfaces 605(a)–(g), which interact with airflow 602. Although seven surfaces are shown on rotating member 104 in FIG. 6, the number of surfaces is a function of the application of the rotating member. Any suitable number that meets the design requirements may be used.

Figure 7:
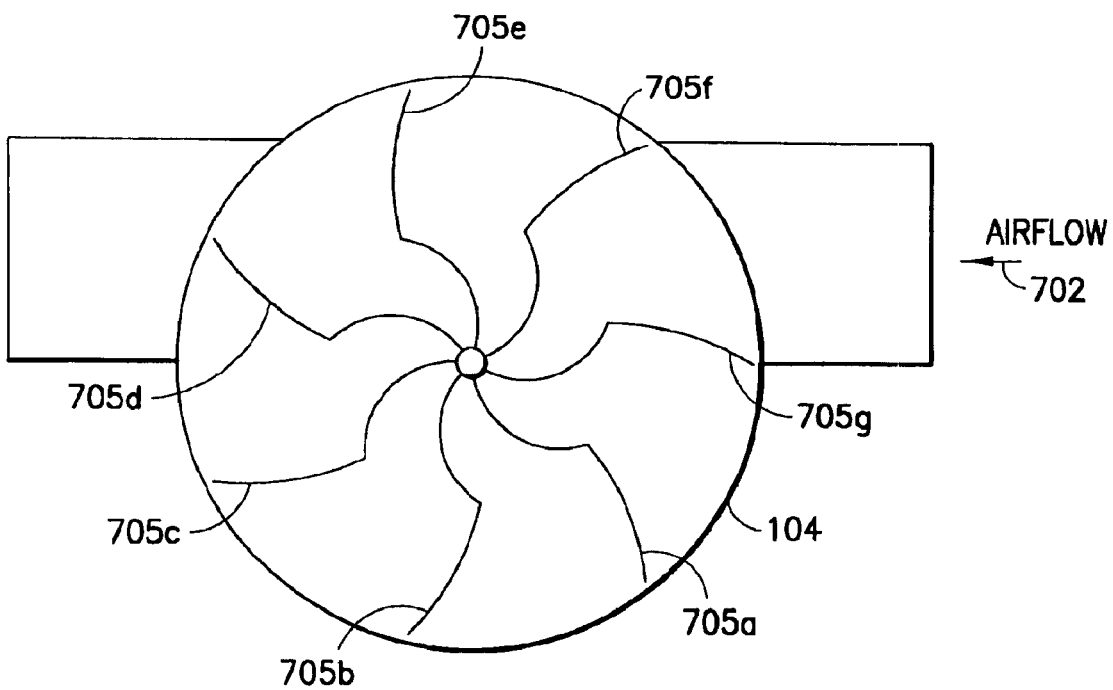
FIG. 7 is a schematic side view of a rotating member having mixed flow shape surfaces.

FIG. 7 shows an embodiment where the rotating member surfaces provide a mixed flow shape. The rotating member 104 has mixed flow shaped surfaces 705(a)–(g), which interact with airflow 702. Although seven surfaces are shown on rotating member 104 in FIG. 7, the number of surfaces is a function of the application of the rotating member. Any suitable number that meets the design requirements may be used.

It is also possible for the apparatus of the invention to be self-powered. Such an embodiment includes a rotating member, for example, a blade or turbine, that is disposed in the duct. The blade rotates in response to the flow of fluid through the duct. A shaft of the rotating member is coupled to a motor/generator (e.g., a DC motor that when spinning, generates an electric current as well known in the art). A control circuit is powered by the electric current generated by the motor/generator, and provides a control signal that is fed back to the motor/generator. By using the control signal to slow down or speed up the motor/generator speed, the rotational speed of the blade can be varied. Since the control circuit is powered by the motor/generator, a self-powered system is advantageously provided. This allows the flow control device of the present invention to be installed at remote locations without the need to run a separate power line thereto. Such a design is particularly advantageous in large commercial buildings, warehouses, factories, etc. where airflow in a duct may need to be controlled in locations where no existing power source is conveniently located.

While methods and apparatus consistent with the present invention have been particularly shown with reference to the above embodiments, it will be understood by those skilled in the art that various changes in the form and details may be made thereto without departing from the spirit and the scope of the invention. All such adaptations and modifications are intended to be covered by the claims.

What is claimed is:

1. A method for modulating airflow in a duct, comprising the steps of:
   driving a rotating element with said airflow;
   providing a flow signal indicative of the flow rate; and
   varying a rate of rotation of the rotating element by direct control of said element in response to the flow signal to modulate the airflow.

2. The method as claimed in claim 1, wherein a rotational speed of said rotating element is used to provide said flow signal.

3. The method as claimed in claim 1, wherein the varying step uses a braking unit responsive to said flow signal to vary the rate of rotation of the rotating element.

4. The method as claimed in claim 3, wherein a rotational speed of said rotating element is used to provide said flow signal.

5. The method as claimed in claim 2, wherein said rotational speed is determined by at least one of a magnetic sensor, photoelectric sensor, acoustic sensor, strain gage, or optical sensor.

6. The method as claimed in claim 2, wherein said rotational speed is determined from a signal generated by a motor driven by said rotating element.

7. The method as claimed in claim 1, wherein said flow rate is linearly related to said rate of rotation.

8. A method for fluid flow control within a duct comprising the steps of:
   providing a flow of fluid to rotate a turbine disposed in the duct;
   sensing said flow of fluid in the duct; and
   providing electrical signals in response to the sensing step to directly modify rotation of the turbine, thereby controlling the fluid flow.

9. The method of claim 8 wherein the sensing step uses a motor to sense the rotation and the providing step uses the motor to modify the rotation.

10. The method of claim 8 wherein the sensing step uses at least one of a magnetic sensor, photoelectric sensor, acoustic sensor, strain gage, or optical sensor to sense the rotation.

11. Apparatus for modulating a flow of fluid in a duct comprising:
   a rotating member adapted to rotate in the duct;
   a sensing unit adapted to sense a flow of fluid through the duct and generate a flow signal as a function of the sensed flow; and
   a control unit adapted to receive the flow signal from the sensing unit and to generate a control signal for directly modifying a rotational speed of the rotating member.

12. Apparatus in accordance with claim 11 wherein said sensing unit senses said flow by determining said rotational speed.

13. Apparatus in accordance with claim 12 wherein said rotational speed is modified using at least one of a clutch, brake or motor that is responsive to said control signal.

14. Apparatus in accordance with claim 11 wherein said sensing unit comprises an electric motor coupled to said rotating member for generating said flow signal, and said rotational speed is modified using said motor.

15. Apparatus in accordance with claim 14 wherein said control signal shunts said motor.

16. Apparatus in accordance with claim 11 wherein said rotational speed is modified using at least one of a clutch, brake or motor that is responsive to said control signal.

17. Apparatus in accordance with claim 11 wherein said rotational speed is modified using a pneumatic element.

18. Apparatus in accordance with claim 11 wherein the control unit is one of a proportional-integral (PI) or proportional-integral-derivative (PID) controller.

19. Apparatus in accordance with claim 18 wherein said control unit receives a setpoint signal to establish a desired rotational speed for the rotating member.

20. Apparatus in accordance with claim 11 wherein the duct is at least one of a heating, ventilation and air conditioning duct.

21. Apparatus in accordance with claim 11, further comprising a housing for mounting the rotating member in the duct.

22. Apparatus in accordance with claim 21, wherein the housing has an inlet portion and an outlet portion.

23. Apparatus in accordance with claim 11, wherein the rotating member is shaped as a forward curve.

24. Apparatus in accordance with claim 11 wherein the rotating member is shaped as a backward curve.

25. Apparatus in accordance with claim 11 wherein the rotating member has a mixed flow shape.

26. Apparatus for controlling a flow of fluid in a duct comprising:

a blade disposed in the duct, the blade being adapted to rotate in response to the flow of fluid through the duct;

means for generating an electric current in response to rotation of the blade; and a control circuit powered by the electric current, the control circuit adapted to provide a control signal to directly control the speed of rotation of the blade.

27. Apparatus in accordance with claim 26 wherein said electric current is provided by a motor/generator coupled to said blade.

28. Apparatus in accordance with claim 27 wherein the control signal is provided from the control circuit to the motor/generator to control the speed of rotation of the blade.

* * * * *